(12) United States Patent
Bastide et al.

(10) Patent No.: US 10,222,856 B2
(45) Date of Patent: *Mar. 5, 2019

(54) AVATAR-BASED AUGMENTED REALITY ENGAGEMENT

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US); Sathyanarayanan Srinivasan, Cambridge, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/005,912

(22) Filed: Jun. 12, 2018

(65) Prior Publication Data
US 2018/0292893 A1    Oct. 11, 2018

Related U.S. Application Data

(63) Continuation of application No. 15/708,298, filed on Sep. 19, 2017, now Pat. No. 10,025,377, which is a (Continued)

(51) Int. Cl.
*G09G 5/00* (2006.01)
*G06F 3/01* (2006.01)
(Continued)

(52) U.S. Cl.
CPC .......... *G06F 3/011* (2013.01); *G06F 3/04847* (2013.01); *G06T 13/205* (2013.01); *G06T 13/40* (2013.01)

(58) Field of Classification Search
CPC .... G06F 3/011; G06F 3/04847; G06T 13/205; G06T 13/40
(Continued)

(56) References Cited

U.S. PATENT DOCUMENTS

| 2006/0235790 A1 | 10/2006 | Jung et al. |
| 2009/0043682 A1 | 2/2009 | Jung et al. |

(Continued)

FOREIGN PATENT DOCUMENTS

WO    2014068567 A1    5/2014

OTHER PUBLICATIONS

Mell, et al., "The NIST Definition of Cloud Computing," National Institute of Standards and Technology, U.S. Department of Commerce, Special Publication 800-145, Sep. 2011, pp. 1-7.
(Continued)

*Primary Examiner* — Sarah Lhymn
(74) *Attorney, Agent, or Firm* — Michael O'Keefe

(57) ABSTRACT

A method, computer system, and computer program product for determining an engagement level of an individual is provided. The present invention may include capturing a plurality of image data depicting a relative location of a user. The present invention may also include identifying an individual within the captured image data. The present invention may further include gathering a plurality of engagement level indicator data associated with the identified individual. The present invention may also include calculating a current engagement level of the identified individual using the plurality of gathered engagement level indicator data.

1 Claim, 5 Drawing Sheets

Related U.S. Application Data continuation of application No. 15/481,915, filed on Apr. 7, 2017.

(51) Int. Cl.
  *G06T 13/20* (2011.01)
  *G06T 13/40* (2011.01)
  *G06F 3/0484* (2013.01)

(58) Field of Classification Search
  USPC .......................................... 345/619, 632, 633
  See application file for complete search history.

(56) References Cited

U.S. PATENT DOCUMENTS

| | | |
|---|---|---|
| 2011/0161076 A1 | 6/2011 | Davis et al. |
| 2013/0044130 A1 | 2/2013 | Geisner et al. |
| 2014/0074824 A1 | 3/2014 | Rad et al. |
| 2014/0108530 A1 | 4/2014 | Papakipos et al. |
| 2014/0168277 A1 | 6/2014 | Ashley et al. |
| 2014/0294257 A1 | 10/2014 | Tussy |
| 2015/0189026 A1 | 7/2015 | Cohen et al. |
| 2015/0256574 A1 | 9/2015 | Sanchez et al. |
| 2015/0279117 A1 | 10/2015 | Schimke |
| 2016/0055236 A1 | 2/2016 | Frank et al. |
| 2016/0093108 A1 | 3/2016 | Mao et al. |
| 2016/0299563 A1 | 10/2016 | Stafford et al. |
| 2017/0140054 A1 | 5/2017 | Wu et al. |
| 2017/0228520 A1 | 8/2017 | Kidd et al. |
| 2017/0289341 A1 | 10/2017 | Rodriguez et al. |
| 2017/0295404 A1 | 10/2017 | Meredith et al. |

OTHER PUBLICATIONS

Microsoft, "Microsoft Cognitive Services—Emotion API", https://www.microsoft.com/cognitive-services/en-us/emotion-api, copyright 2016 Microsoft, pp. 1-7, printed Feb. 8, 2017 (best date available).

Bastide et al., Pending U.S. Appl. No. 15/481,915, filed Apr. 7, 2017, titled "Avatar-Based Augmented Reality Engagement", pp. 1-30.

Bastide et al., Pending U.S. Appl. No. 15/708,298, filed Sep. 19, 2017, titled "Avatar-Based Augmented Reality Engagement", pp. 1-28.

AVATAR-BASED AUGMENTED REALITY ENGAGEMENT

BACKGROUND

The present invention relates, generally, to the field of computing, and more particularly to augmented reality.

Augmented reality relates to technology that modifies a direct or indirect user view of a real-world environment with computer-generated elements using various inputs, such as sound data, image data, or location data. Various technologies may be implemented when utilizing augmented reality, such as eyeglasses, head-mounted displays, head-up displays, contact lenses, virtual reality displays, and handheld displays. Augmented reality may have numerous applications within society including uses in literature, architecture, visual art, education, emergency management, video gaming, medicine, military, navigation, tourism, language translation, and music production.

SUMMARY

According to one embodiment, a method, computer system, and computer program product for determining an engagement level of an individual is provided. The present invention may include capturing a plurality of image data depicting a relative location of a user. The present invention may also include identifying an individual within the captured image data. The present invention may further include gathering a plurality of engagement level indicator data associated with the identified individual. The present invention may also include calculating a current engagement level of the identified individual using the plurality of gathered engagement level indicator data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
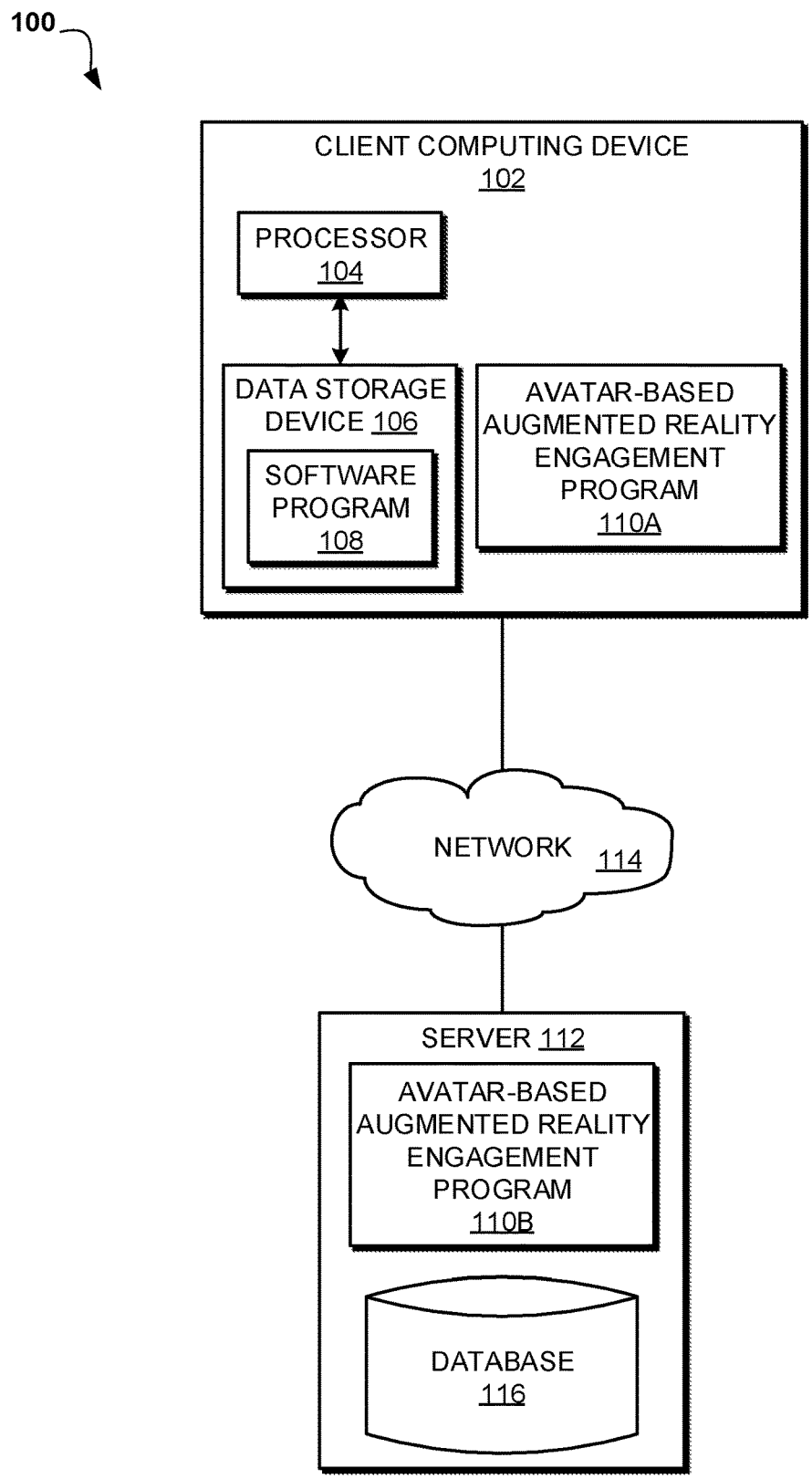
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to augmented reality. The following described exemplary embodiments provide a system, method, and program product to, among other things, determine the engagement interest of an individual within view of a user based on various engagement indicators and modify the user's augmented reality view to convey the determined engagement interest level of the individual to the user. Therefore, the present embodiment has the capacity to improve the technical field of augmented reality by enhancing group dynamics using augmented reality, providing a clear signal to a user of another individual's interest in engagement, improving person-to-person engagement, and expanding the collaboration and augmented reality experience.

As previously described, augmented reality relates to technology that modifies a direct or indirect user view of a real-world environment with computer-generated elements using various inputs, such as sound data, image data, or location data. Various technologies may be implemented when utilizing augmented reality, such as eyeglasses, head-mounted displays, head-up displays, contact lenses, virtual reality displays, and handheld displays. Augmented reality may have numerous applications within society including uses in literature, architecture, visual art, education, emergency management, video gaming, medicine, military, navigation, tourism, language translation, engagement and music production.

Many vendors of augmented reality devices are driving changes in user behavior, such as presenting contact information between users, combining reality environments with gaming, and overlaying map information with reality environments. Combination of live views with digital flags and markers in augmented reality may enable useful information to be presented and acted upon by users. Therefore, many untapped possibilities to enhance the user experience with augmented reality remain.

For example, in social gatherings, an individual may encounter an awkward process of beginning a conversation with another person with whom the individual has never met. The unknown person may have an unfamiliar nature, an off-putting posture, or facial expressions which deter others from engaging, and tending to avoid a new conversation. Such behavior may result in lost business connections since individuals may be deterred from beginning new conversations with the unmet person due to the unmet person's body language. As such, it may be advantageous to, among other things, use augmented reality devices to determine an individual's intent to engage with others and modify a user's augmented reality view of the individual to convey the determined intent to engage.

According to one embodiment, when a user intends to engage with other individuals, the user may designate a topic with which the user wishes to engage in with other individuals. The augmented reality device may capture an image of the user's view through the augmented reality device and identify an individual through image recognition technology. Engagement level data, such as topical social media posts and physical body language, may be gathered and analyzed to determine the individual's likelihood of engagement. If the individual's likelihood of engagement exceeds a threshold value, the user's view through the augmented reality device may be modified with an avatar that indicates the likelihood of engagement.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify individuals within a user's view through an augmented reality device that are likely to engage with the user on a specific topic and augment the user's view through the augmented reality device with an avatar that conveys the likelihood of engagement with the individual to the user.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an avatar-based augmented reality engagement program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an avatar-based augmented reality engagement program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the avatar-based augmented reality engagement program 110A, 110B may be a program capable of identifying individuals with a user's view through an augmented reality device, calculating a level of engagement for each identified individual, and modifying the user's view through the augmented reality device to convey each identified individual's calculated level of engagement. The avatar-based augmented reality engagement method is explained in further detail below with respect to FIG. 2.

Figure 2:
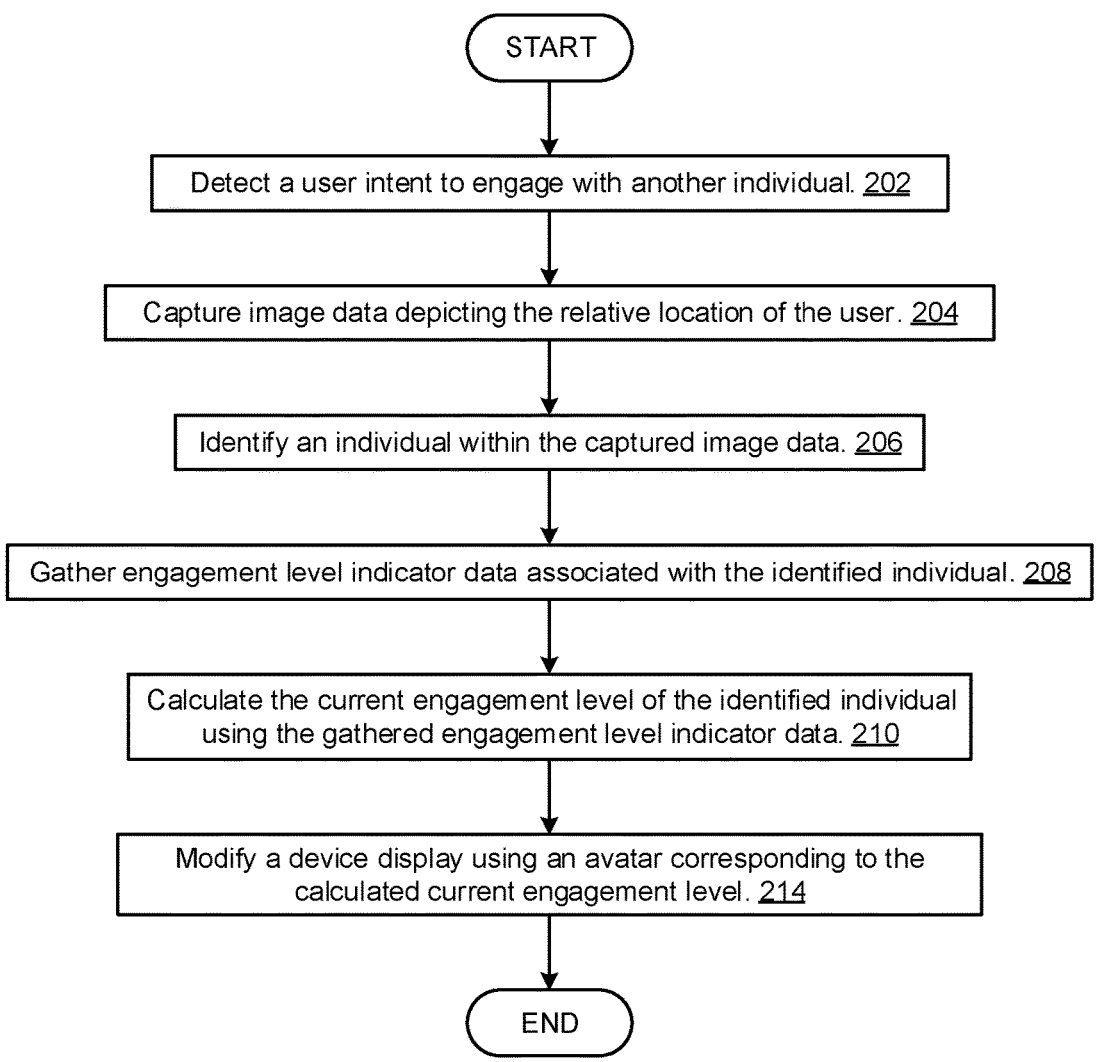
FIG. 2 is an operational flowchart illustrating an avatar-based augmented reality engagement process according to at least one embodiment.

Referring now to FIG. 2, an operational flowchart illustrating an avatar-based augmented reality engagement process 200 is depicted according to at least one embodiment. At 202, the avatar-based augmented reality engagement program 110A, 110B detects a user's intent to engage with another individual. The avatar-based augmented reality engagement program 110A, 110B may determine that the user intends to engage with another individual based on user interactions with the augmented reality device, such as audible phrases spoken into a microphone, a button push, activation of a menu, user gestures captured by an image capture device associated with the augmented reality device, and user attention to a specific individual. For example, if a user is walking among booths at a trade show, the avatar-based augmented reality engagement program 110A, 110B may determine the user wishes to engage with a booth presenter when the user's vision focuses on the presenter. Similarly, the avatar-based augmented reality engagement program 110A, 110B may determine the user wishes to engage with another individual when the user opens a menu within the avatar-based augmented reality engagement program 110A, 110B. In at least one embodiment, the user may also indicate a topic with which the user wishes to engage other individuals. For example, if the user wishes to discuss the topic of video conferencing, the user may interact with the user device through speech or text inputs to designate the topic with the avatar-based augmented reality engagement program 110A, 110B.

Then, at 204, the avatar-based augmented reality engagement program 110A, 110B captures image data depicting the relative location of the user. Once the avatar-based augmented reality engagement program 110A, 110B determines the user wishes to engage with an individual, the avatar-based augmented reality engagement program 110A, 110B may utilize an image capture device, such as a camera, associated with the client computing device 102 to capture image data, such as a picture or a video, of the user's current view. For example, in the previous situation where the user is traversing a trade show floor, the avatar-based augmented reality engagement program 110A, 110B may take a picture of the user's view of the trade show floor including the individuals within the user's current view.

Next, at 206, the avatar-based augmented reality engagement program 110A, 110B identifies an individual within the captured image data. The avatar-based augmented reality engagement program 110A, 110B may utilize known image recognition technology, such as facial recognition, and social media data, such as location check-in information and livestreaming information, to identify each individual within the captured image data. For example, with respect to the previous example, if a picture taken by a user's device captures a booth presenter at a trade show, the avatar-based augmented reality engagement program 110A, 110B may utilize facial recognition technology and the searching of social media networks to identify the presenter. In at least one embodiment, the avatar-based augmented reality engagement program 110A, 110B may identify the individual using profile information of registered users of the software program 108 stored on a data repository, such as database 116.

Then, at 208, the avatar-based augmented reality engagement program 110A, 110B gathers engagement level indicator data associated with the identified individual. The engagement level indicator data may be any data used to determine an individual's interest in engaging with the user on a user-designated topic. The engagement level indicator data for each individual may include physical attribute information and social media information. Physical attribute information may relate to information within the physical realm that may be attributed to the individual, such as facial expressions, posture, laughter volume, emoted speech, eye elongation, iris elongation, and other body language characteristics for various emotions and interest levels. Social media information may relate to information available on social media profiles associated with the identified individual. The social media information gathered for each individual by the avatar-based augmented reality engagement program 110A, 110B may include the time ratio of online chatting versus in-person chatting, a current social media profile status, areas of expertise, current social media availability, number of friends on a social media platform, number of followers on a social media platform, number of connections on a social media platform, number of different people in social media photographs, number of daily message exchanges, number of new connections formed after a generic social media event, number of social media mentions, number of places travelled, number of events attended, number of interests logged, number of groups with which the individual is involved.

Once the engagement level indicator information is gathered, the avatar-based augmented reality engagement program 110A, 110B may generate a profile for each individual and store the gather engagement level indicator information in the generated profile. The generated profile may then be stored in a data repository, such as database 116.

In at least one embodiment, the engagement level indicator information may also include fitness data collected by wearable technology. For example, if an individual uses a fitness tracker with heart rate capabilities, the avatar-based augmented reality engagement program 110A, 110B may gather the heart rate information collected by the fitness tracker in order to assist in determining the individual's mood and engagement level. Additionally, the avatar-based augmented reality engagement program 110A, 110B may analyze the quality of both the physical and online conversations in which the individual engages in order to develop a better engagement level for the individual. The quality of a conversation may be determined using known natural language processing technology.

Then, at 210, the avatar-based augmented reality engagement program 110A, 110B calculates the current engagement level of the identified individual using the gathered engagement level indicator data. The calculated engagement level may be represented as a value on a sliding scale, such as an integer between one and five. Based on the presence of various characteristics, the avatar-based augmented reality engagement program 110A, 110B may shift the value of the engagement level along the sliding scale. Characteristics within the gathered engagement level indicator data that reflect an individual's low interest in engagement may shift the sliding scale to a lower value. Conversely, characteristics within the gathered engagement level indicator data that reflect an individual's high interest in engagement may shift the sliding scale to a high value. For example, if an individual is sitting with folded arms and looking at the ceiling, the avatar-based augmented reality engagement program 110A, 110B may determine the individual has a low engagement level on the sliding scale. Similarly, if an individual is standing and greeting trade show attendees while also having a strong presence on social media that day, the avatar-based augmented reality engagement program 110A, 110B may determine the user has a high engagement level on the sliding scale.

Additionally, the avatar-based augmented reality engagement program 110A, 110B may inject a variability of conversations in order to determine the likelihood of engagement. The variability injected by the avatar-based augmented reality engagement program 110A, 110B may be categorical or physical. A categorical variable may establish the percentage with which a conversation may vary. A physical variable may weigh physical criteria to determine the likelihood that the user may enter a conversation with an individual. For example, if Fred has spoken to or been in close proximity to Ralph for 3 hours, a randomness of conversation injection by the user may be valuable when calculating the likelihood of engagement.

In at least one embodiment, the avatar-based augmented reality engagement program 110A, 110B may push the gathered engagement level indicator data into an analytical model to generate a relative engagement model. The relative engagement model may show an individual's engagement compared to other individuals within the captured image data. For example, if presenter A and presenter B are depicted with in the image data the avatar-based augmented reality engagement program 110A, 110B captured of a trade show floor, the relative engagement model may determine that presenter A is more willing to engage the user on a specific topic than presenter B.

Next, at 212, the avatar-based augmented reality engagement program 110A, 110B modifies an augmented reality device display using an avatar corresponding to the calculated current engagement level for the identified individual. Once the avatar-based augmented reality engagement program 110A, 110B calculates the current engagement level for the identified individual, the avatar-based augmented reality engagement program 110A, 110B may generate an avatar to display on the augmented reality device display. The generated avatar may be unique to the calculated engagement level based on the identified individual's openness to engage with the user. For example, if the engagement level is calculated on a rating scale from one to five and an avatar with varying degrees open arms is used, the avatar-based augmented reality engagement program 110A, 110B may convert the value of engagement level for a corresponding degree between 0 and 90 where 0 corresponds to an avatar with arms at sides and 90 corresponds to an avatar having open arms, which may be seen as more inviting. Other characteristics, such as color or size, of the avatar may be modified based on the calculated engagement level of the identified individual. Additionally, the avatar may be determined based on pre-configured selections by either the user or the individual to whom the avatar corresponds.

In at least one embodiment, the avatar may be adjusted based on a group of individuals within the captured image data within a set proximity. For example, presenter A and presenter B may be within the user's view but both presenter A and presenter B, individually, may have a low engagement level for the user. However, presenter A and presenter B as a group may have a high engagement level for the user. Therefore, the avatar may be modified accordingly to illustrate to the user that a high likelihood of engagement exists for the user to engage with presenter A and presenter B as a group.

In at least one other embodiment, the avatar-based augmented reality engagement program 110A, 110B may overlay the avatar onto or juxtapose the avatar to the individual from the user's first person perspective through the augmented reality device. Alternatively, when displaying the modified augmented reality device display, the avatar-based augmented reality engagement program 110A, 110B may overlay the avatar on a map (i.e., a top-down viewpoint) as the user navigates to the preferred person to engage. The map may be displayed on a portion of the user's first person perspective through the augmented reality device so the user may navigate the surroundings while also easily identifying the location of the identified individual.

It may be appreciated that FIG. 2 provides only an illustration of one implementation and does not imply any limitations with regard to how different embodiments may be implemented. Many modifications to the depicted environments may be made based on design and implementation requirements. For example, the avatar-based augmented reality engagement program 110A, 110B may recalculate the current engagement level for an individual based on a variety of factors, such as passage of a preconfigured period of time, a change in the individual's body language, and a change in the intended topic to be discussed. Additionally, the avatar-based augmented reality engagement program 110A, 110B may be automated with known natural language processing and known machine learning algorithms to detect the quality of conversation the user had with the individual and alter the individual's profile accordingly for future engagements with other users.

Figure 3:
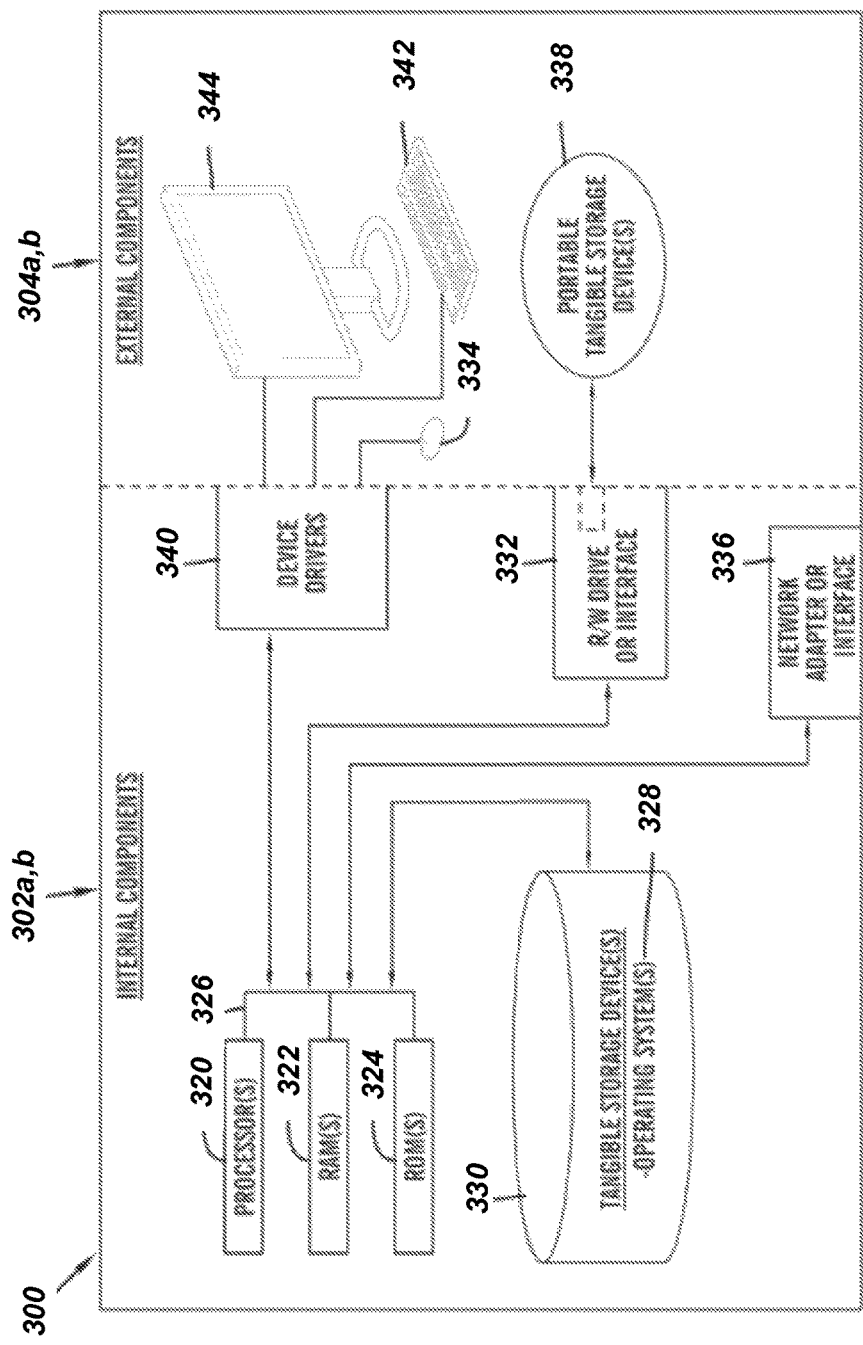
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the avatar-based augmented reality engagement program 110A in the client computing device 102 and the avatar-based augmented reality engagement program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the avatar-based augmented reality engagement program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the avatar-based augmented reality engagement program 110A in the client computing device 102 and the avatar-based augmented reality engagement program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the avatar-based augmented reality engagement program 110A in the client computing device 102 and the avatar-based augmented reality engagement program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
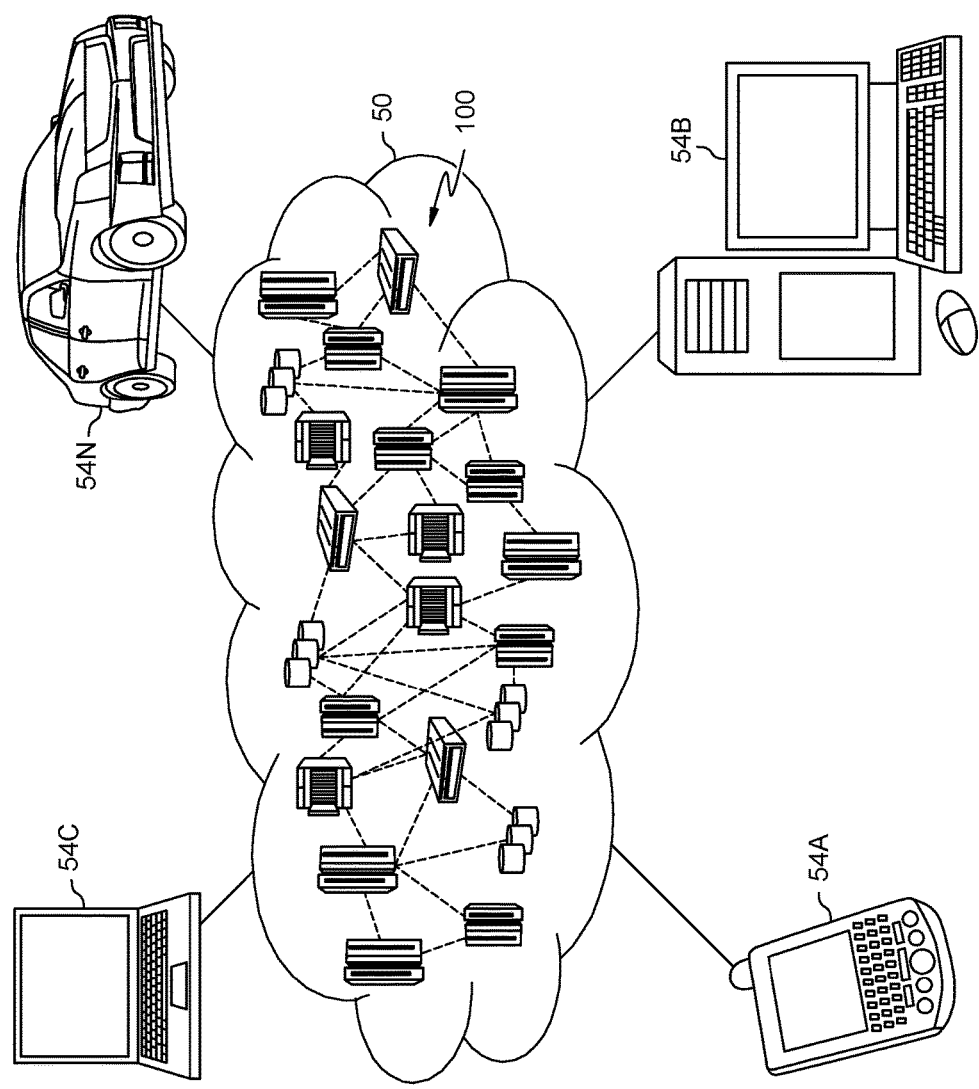
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
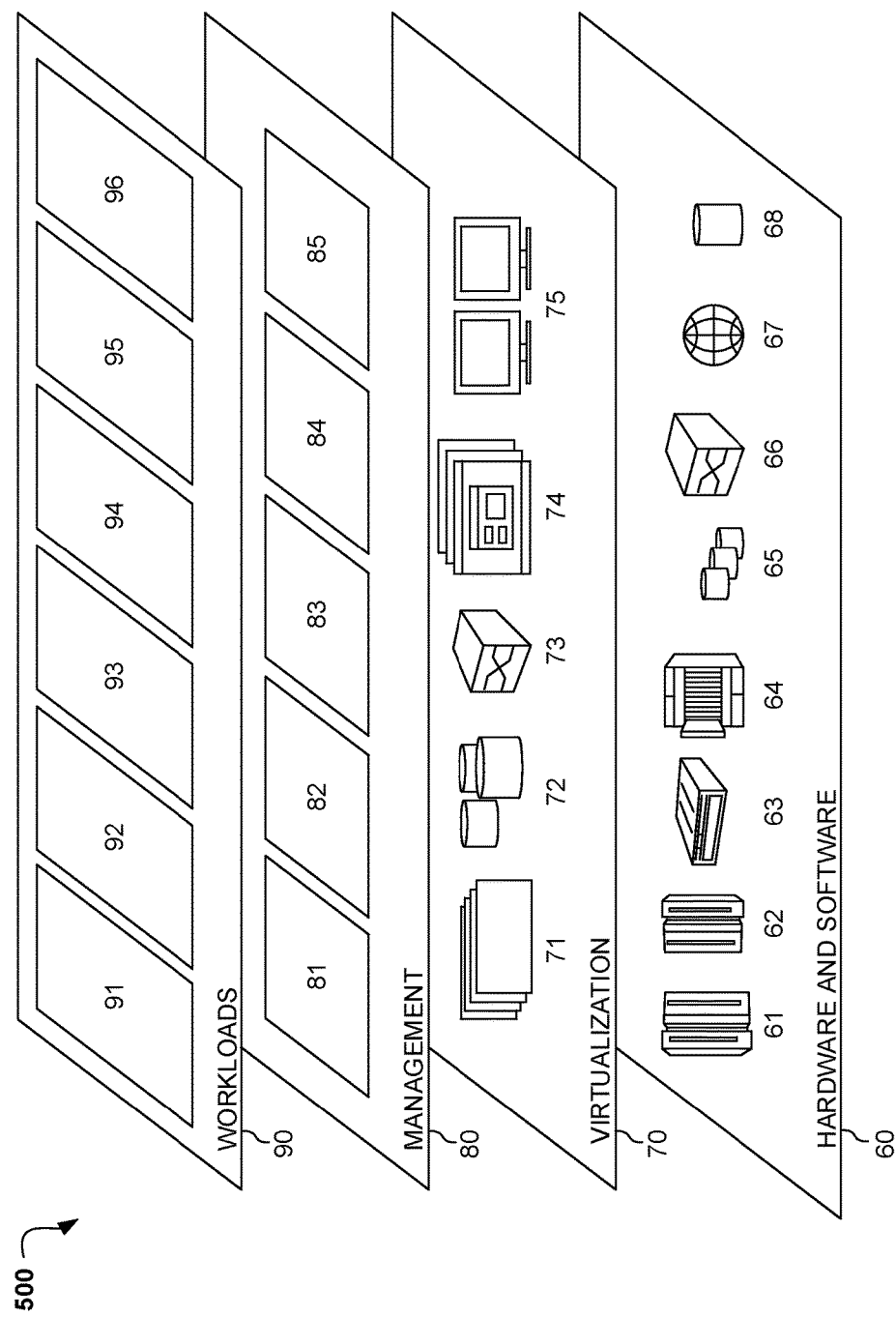
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and avatar-based augmented reality engagement 96. Avatar-based augmented reality engagement 96 may relate to identifying an individual within a user's view through an augmented reality device and modifying the view of the individual with an avatar that corresponds to the individual's current level of engagement based on gathered engagement indicator data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for determining an engagement level of an individual, the computer system comprising:

one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

detecting, by a processor, a user intent to engage with another individual based on a user interaction with an augmented reality device;

receiving a user-designated topic in which a user wishes to engage with one or more individuals;

capturing a plurality of image data depicting a current user view using an image capture device associated with an augmented reality device;

identifying an individual within the captured image data using facial recognition, a social media location check-in, and a plurality of livestreaming information;

generating a profile for each identified individual;

storing the generated profile in a repository;

gathering a plurality of engagement level indicator data associated with the identified individual, wherein the plurality of engagement level indicator data is a plurality of data used to determine an individual's interest in engaging with a user in the user-designated topic;

storing the gathered plurality of engagement level indicator data in the generated profile;

calculating a current engagement level of the identified individual using the plurality of gathered engagement level indicator data and a variability of conversation of the identified individual with one or more other individuals, wherein a variability of conversation is categorical or physical, and wherein a categorical variability of conversation establishes a percentage chance with which a conversation varies from the user-designated topic, and a physical variability of conversation weighs a plurality of physical criteria to determine a likelihood the user will enter into a conversation with the identified individual; and generating a relative engagement model using the calculated current engagement level; wherein the generated relative engagement model is an analytical model that shows an engagement of the identified individual compared to one or more other individuals within captured plurality of image data.

* * * * *